US010099165B2

(12) United States Patent
Walls et al.

(10) Patent No.: US 10,099,165 B2
(45) Date of Patent: Oct. 16, 2018

(54) CURVED NANOFIBER PRODUCTS AND APPLICATIONS THEREOF

(71) Applicant: RESEARCH TRIANGLE INSTITUTE, Research Triangle Park, NC (US)

(72) Inventors: Howard Jerome Walls, Apex, NC (US); Randall J. Newsome, Apex, NC (US); Anthony Clint Clayton, Rougemont, NC (US); Robert W. Yaga, Durham, NC (US); David Samuel Ensor, Chapel Hill, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 273 days.

(21) Appl. No.: 14/975,978

(22) Filed: Dec. 21, 2015

(65) Prior Publication Data

US 2016/0243480 A1 Aug. 25, 2016

Related U.S. Application Data

(63) Continuation of application No. 14/189,684, filed on Feb. 25, 2014, now abandoned.

(60) Provisional application No. 61/769,561, filed on Feb. 26, 2013.

(51) Int. Cl.

| | | |
|---|---|---|
| *B01D 46/00* | (2006.01) | |
| *B01D 46/10* | (2006.01) | |
| *A62B 23/02* | (2006.01) | |
| *B01D 46/54* | (2006.01) | |
| *A62B 18/02* | (2006.01) | |
| *A62B 18/04* | (2006.01) | |
| *A62B 18/08* | (2006.01) | |
| *D01D 5/00* | (2006.01) | |

(52) U.S. Cl.
CPC .......... *B01D 46/0001* (2013.01); *A62B 18/02* (2013.01); *A62B 18/04* (2013.01); *A62B 18/084* (2013.01); *A62B 23/025* (2013.01); *B01D 46/103* (2013.01); *B01D 46/546* (2013.01); *D01D 5/0076* (2013.01); *D10B 2509/00* (2013.01)

(58) Field of Classification Search
CPC .. B01D 46/00; B01D 46/0001; B01D 46/103; B01D 46/546; A62B 18/00; A62B 18/02; A62B 18/04; A62B 18/084; A62B 23/025; D01D 5/0076; D10B 2509/00
USPC .......................................................... 55/500
See application file for complete search history.

(56) References Cited

U.S. PATENT DOCUMENTS

| | | |
|---|---|---|
| 4,850,347 A | 7/1989 | Skov |
| 5,435,299 A | 7/1995 | Langman |
| 5,656,368 A | 8/1997 | Braun et al. |
| 6,277,178 B1 | 8/2001 | Holmquist-Brown et al. |

(Continued)

*Primary Examiner* — T. Bennett McKenzie

(57) ABSTRACT

A filtration device including a contoured support having 1) an interior surface, 2) an outside peripheral surface spaced farther from a center of the contoured support than the interior surface, and 3) a rim enclosed and sealed to a perimeter of the contoured support. The filtration device includes macroscopic openings in the contoured support extending from the interior surface to the outside peripheral surface, and a plurality of nanofibers having diameters less than 1 micron. The nanofibers are disposed on the outside peripheral surface of the contoured support, and cover the macroscopic openings to form a filtration medium on the contoured support.

18 Claims, 14 Drawing Sheets

(56) References Cited

U.S. PATENT DOCUMENTS

| | | | |
|---|---|---|---|
| 7,789,930 B2 | 9/2010 | Ensor et al. | |
| 8,652,229 B2 | 2/2014 | Ensor et al. | |
| 2003/0203162 A1 | 10/2003 | Fenwick et al. | |
| 2005/0266758 A1 | 12/2005 | Nishikori et al. | |
| 2006/0094320 A1 | 5/2006 | Chen et al. | |
| 2008/0110342 A1* | 5/2008 | Ensor | B01D 39/1623 96/54 |
| 2008/0110464 A1 | 5/2008 | Davidson et al. | |
| 2008/0241297 A1* | 10/2008 | Park | B82Y 30/00 425/131.5 |
| 2009/0199717 A1 | 8/2009 | Green et al. | |
| 2010/0000409 A1 | 1/2010 | Alper | |
| 2010/0043639 A1 | 2/2010 | Fox et al. | |
| 2010/0084791 A1* | 4/2010 | Wu | D01D 5/00 264/441 |
| 2011/0174158 A1* | 7/2011 | Walls | B01D 39/1623 96/60 |
| 2011/0212321 A1* | 9/2011 | Cakmak | D01D 5/0084 428/323 |
| 2013/0068098 A1* | 3/2013 | Haslam | B82Y 30/00 95/273 |

* cited by examiner

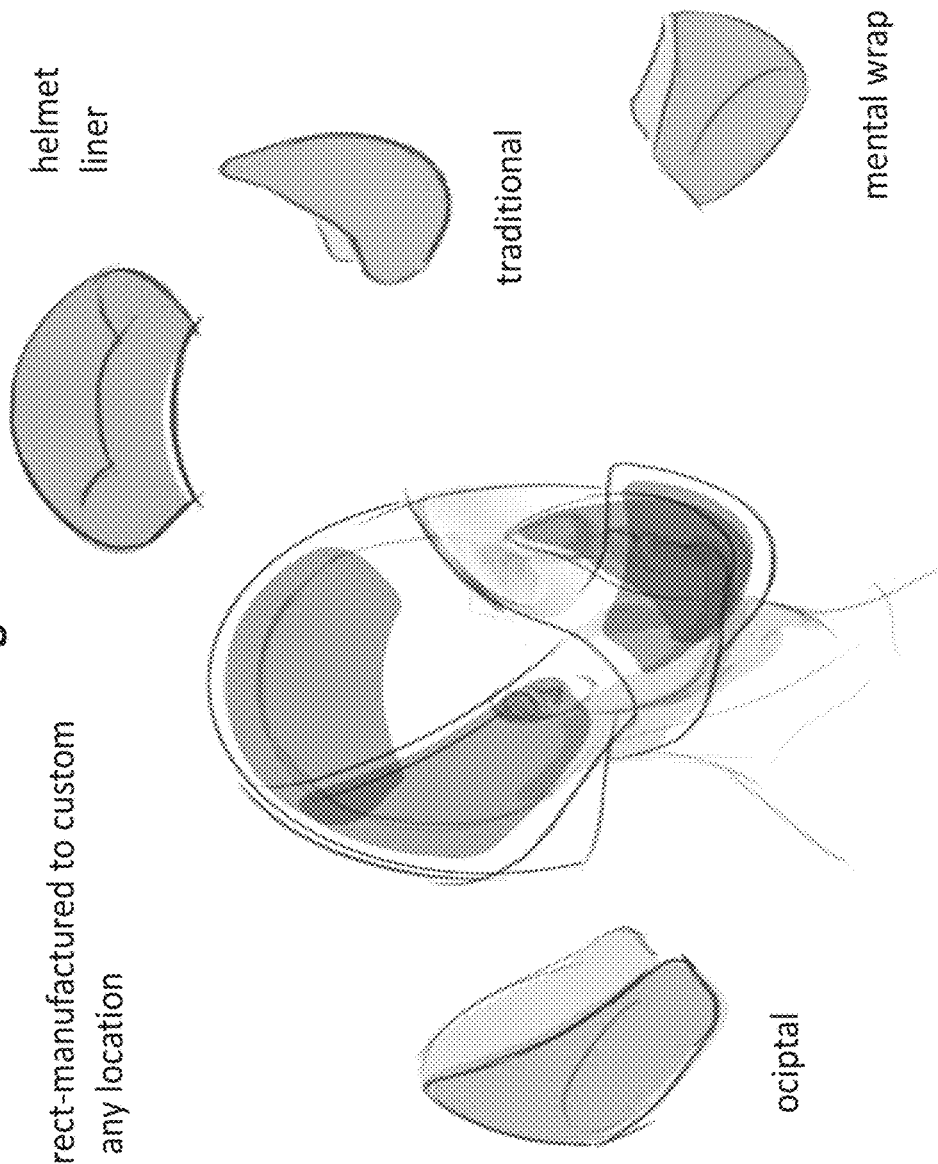

CURVED NANOFIBER PRODUCTS AND APPLICATIONS THEREOF

CROSS REFERENCE TO RELATED APPLICATIONS

This application is a continuation of U.S. Ser. No. 14/189,684 filed Feb. 25, 2014, the entire contents of which is incorporated herein by reference. U.S. Ser. No. 14/189,684 is based upon and claims the benefit of priority from U.S. provisional application No. 61/769,561, filed Feb. 26, 2013, the entire contents of which are incorporated herein by reference. This application is related to U.S. Pat. No. 7,134,857, filed on Apr. 8, 2004, entitled "Electrospinning of Polymer Nanofibers Using a Rotating Spray Head," the entire contents of which are incorporated herein by reference. This application is also related to U.S. Pat. No. 7,762,801, filed on Apr. 8, 2004, entitled "Electrospray/electrospinning Apparatus and Method," the entire contents of which are incorporated herein by reference. This application is related to U.S. Pat. No. 7,297,305, filed Apr. 8, 2004, entitled "Electrospinning in a Controlled Gaseous Environment," the entire contents of which are incorporated herein by reference. This application is related to U.S. Pat. No. 7,592,277, filed May 17, 2005 entitled "Nanofiber Mats and Production Methods Thereof," the entire contents of which are incorporated herein by reference. This application is related to U.S. Pat. No. 7,789,930, filed Nov. 13, 2006 entitled "Particle filter system incorporating nanofibers," the entire contents of which are incorporated herein by reference. This application is related to U.S. Ser. No. 61/734,105, filed Dec. 6, 2012 entitled "Apparatus and Method Using an Electric Field for Creating Uniform Nanofiber Patterns on Nonconductive Materials to Enhance Filtration and for Embedment of Fibers into Materials for Other Applications," the entire contents of which are incorporated herein by reference.

STATEMENT REGARDING FEDERALLY SPONSORED RESEARCH OR DEVELOPMENT

This invention was made with government support under HDTRA1-07-C-0058 awarded by the Defense Threat Reduction Agency. This invention was made with government support under W911SR-07-C-0075 awarded by the DOD Army, Aberdeen Proving Grounds. The government has certain rights in the invention.

BACKGROUND OF THE INVENTION

Field of the Invention

The present invention is related to nanofibers, methods and devices for depositing the nanofibers on curved surfaces, and application of articles formed from the deposited nanofibers.

Description of the Related Art

Fabrication of Filter Media and Filters

The filtration industry has traditionally manufactured particulate air filters using conventional medium such as glass, cotton or polymer fibers made provided as rolled goods. The fibrous media may be made by non-woven processes such as wet laid paper, melt blown-spinning or woven yarn. The material is then transported to equipment where the media is cut, pleated, supported, glued into filter frames, and tested for leaks. Various measures of the properties of the rolled goods include appropriate weight per unit area, porosity, etc. The porous filter media may be pleated or bonded into bags to increase the area of the media within individual filter units to reduce pressure drop. Often screens and other supports are added to prevent collapse of the media from the force of air flowing through the filter unit as dust is collected. Depending on the intended use of the filter, the filter may be tested with an appropriate challenge aerosol at a rated or standard airflow rate for pressure drop and particle collection efficiency, (e. g., ASHRAE 52.2, MIL-STD-282, IEST RP-CC 007.1, NIOSH APRS-STP-0051-00, and NIOSH APRS-0057-00 may be used to test the filters)

Theoretically, a reduction of the diameter of the fibers in a filter has the potential of causing an improvement of the filter system performance. For high efficiency filtration, fiberglass wet-laid papers are widely used having fiber diameters in the 200 nm to 5000 nm size range with the fiber sizes intentionally blended for both durability and filtration performance.

One technique for producing a smaller fiber diameter, and hence a potential for generating improved filtration media, is electrospinning of polymers to make submicron and nanofibers. Electrospinning as currently practiced uses a constant voltage to drive the spinning process defined herein as static field electrospinning. The following patents describe conventional ways to fabricate nanofiber containing filters for various applications: U.S. Pat. Nos. 7,008,465; 6,994,742; 6,974,490; 6,955,775; 6,924,028; 6,875,256; 6,875,249; 6,800,117; 6,746,517; 6,743,273; 6,740,142; 6,716,274; and 6,673,136; the entire contents of each of these patents are incorporated in entirety herein by reference.

The typical approach for making goods from nanofibers is to deposit them onto a pliable substrate such as a woven or nonwoven textile. The substrate supports the nanofibers and makes it possible to handle and transport them. The deposition of the nanofibers is typically conducted either in a planner or cylindrical fashion. For planner geometries a roll-to-roll process can be used as well as a single sheet of some finite dimension; these process are similar to that observed in conventional nonwoven and paper making industries. For cylindrical geometries a rotating cylinder is used to collect the fibers. The nonwoven media is then used either as a cylinder (e.g. a tube) or is cut and used as a sheet. A review of various techniques for fabricating nanofiber containing goods is given by Teo and Ramakrishna (2006) entitled "A review on electrospinning design and nanofibre assemblies," the entire contents of which are incorporated herein by reference.

Conventional layered nanofiber filters made from nanofibers deposited on conventional porous filter media have inherent limitations. The support media of these filters is usually pliable enough to allow pleating or manipulation during the assembly step. Such a pliable substrate media may flex or stretch from the air pressure drop force and may break or debond the nanofibers. The support layer of conventional media may contribute substantially to the pressure drop of the whole structure.

Filtration Metrics and Challenges to Nanofiber Media:

In one metric, filtration performance is described by the particle collection efficiency and filter pressure drop (i.e. resistance to air flow). Filtration efficiency (Eff) for a particular filter of piece of filter media is a function of the particle size and the air flow rate. Filter pressure drop ($\Delta P$) is a function of the air flow rate. For high efficiency filters and filter media (Eff>95%) it is often more convenient to report fractional particle penetration (Pt). For example a high efficiency particulate air (HEPA) filter media with Eff=99.97% for 0.3 µm particles has fractional penetration Pt of $3 \times 10^{-4}$. A convenient metric for comparing filter media is the filter figure of merit (FoM), which considers particle collection efficiency per pressure drop. There are several ways to calculate FoM but here we use FoM=$-$Log(Pt)/$\Delta$P, where $\Delta$P is expressed in kPa. FoM is determined for a particular particle size and filter face velocity. The filter face velocity is the ratio of the air flow rate to the area of the filter media. In conventional HEPA media, the FoM is 12$\pm$2 kPa$^{-1}$ for 0.3 μm particles and a face velocity of 5.3 cm/s.

SUMMARY OF THE INVENTION

In one embodiment of the present invention, there is provided a filtration device including a contoured support having 1) an interior surface, 2) an outside peripheral surface spaced farther from a center of the contoured support than the interior surface, and 3) a rim enclosed and sealed to a perimeter of the contoured support. The filtration device includes macroscopic openings in the contoured support extending from the interior surface to the outside peripheral surface, and a plurality of nanofibers having diameters less than 1 micron. The nanofibers are disposed on the outside peripheral surface of the contoured support, and cover the macroscopic openings to form a filtration medium on the contoured support.

In one embodiment of the present invention, there is provided a respirator including a filtration medium, and a housing holding the filtration medium. The filtration medium includes a contoured support having 1) an interior surface, 2) an outside peripheral surface spaced farther from a center of the contoured support than the interior surface, and 3) a rim enclosed and sealed to a perimeter of the contoured support. The filtration medium includes macroscopic openings in the contoured support extending from the interior surface to the outside peripheral surface, and a plurality of nanofibers having diameters less than 1 micron. The nanofibers are disposed on the outside peripheral surface of the contoured support, and cover the macroscopic openings on the contoured support. A seal secures the filtration medium to the housing.

It is to be understood that both the foregoing general description of the invention and the following detailed description are exemplary, but are not restrictive of the invention.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 8 is a schematic depiction of a helmet assembly according to one embodiment of the present invention.

DETAILED DESCRIPTION OF THE INVENTION

Introduction to the Invention

One aspect of the present invention is a structural configuration and method for improving the FoM of filters. Filter media with an improved FoM translates to filters with reduced air flow resistance, smaller size, and/or improved protection from airborne particulates (aerosols).

The filtration efficiency of a particular filter media is determined by the diameter of the fibers made to make the fibrous media, the spacing and orientation of the fibers, the thickness of the filter media, and presence of defects (thin spots, pin holes, leaks, etc.). Increasing filter media efficiency results in increased air flow resistance. Interestingly, the FoM is often fairly constant from low efficiency to high efficiency filter media for conventional filter materials.

Figure 1A:
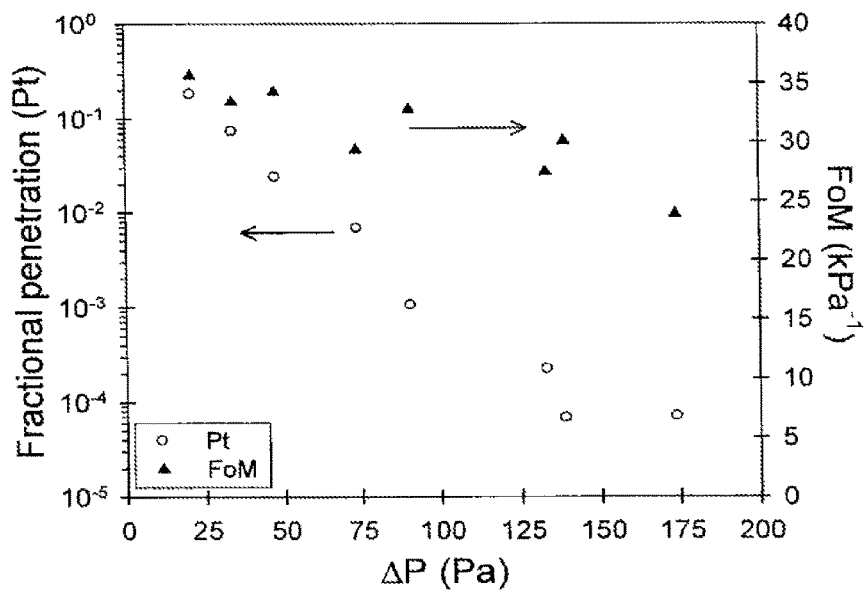
FIG. 1A is a depiction of a thickness series for flat sheet, single later filter media made with PSu.

In the art of electrospun filter media, it has been typically observed that very thin layers of nanofibers (one to three layers thick of fibers) provide low Eff but high FoM. Increasing the Eff by increasing thickness (deposition time of nanofibers) leads to reduced FoM. FIG. 1A is a depiction of a thickness series for flat sheet, single later filter media made with PSu. As filter thickness increases as indicated by filter pressure drop ($\Delta$P), the particle penetration decreases (same as efficiency increases) but the FoM also decreases. FIG. 1A illustrates this effect with flat nanofiber media electrospun by us. Polysulfone nanofibers were deposited to different thickness by varying the electrospinning time. The filter media thickness is given as $\Delta$P (i.e. higher the $\Delta$P the thicker the filter). Thicker filters provide decreased Pt (higher Eff) but FoM is also reduced.

One approach to addressing this problem of deteriorating FoM with increasing nanofiber thickness is to electrospin thin layers and then stack the layers. By stacking lower Eff, high FoM layers, a layered-composite is made that improves Eff with less deterioration of the FoM. However, this approach requires more manufacturing effort and may not be desirable in certain applications. One aspect of the present invention is the retention of high FoM and high Eff (low Pt) without the need of stacking or layering media.

Some features of various embodiments of the present invention include:

Contoured or conformal shapes (beyond that of a cylinder);

Integrated seal;

Mesh-fiber structure;

Filtration performance achieved without necessarily (although suitable) layering of the media; and/or Uniform deposition of media over contoured/conformal surfaces.

Accordingly, the present invention thus pertains to filtration devices, shaped nanofiber constructs, and methods for making the same which provide high efficiency particulate air (HEPA) level of filtration at lower pressure drops. The present invention in one embodiment provides a conformal electrospun aerosol (particulate) filtration media onto shaped profiles and contoured surfaces unlike traditional filtration fabrication techniques where the filtration medium is formed conventionally on flat media.

In another aspect, the present invention controls the deposition of nanofibers onto curved surfaces and permits the production of conformal shaped nanofiber materials in a single step process.

In a preferred example, the filtration medium production process involves the fabrication of a dome shaped support mesh composed of a metallic or conductive material; active positioning of the dome relative to the electrospinning spinneret in a manner to provide equal deposition and coverage of nanofibers across the surface of the dome shaped support mesh as a function of tilt angle; use of auxiliary electric fields in the electrospinning process to promote more uniform deposition; the drawing of the process gasses used in the electrospinning through the dome support mesh with the nanofiber filter media being formed thereon while monitoring the pressure drop across the filtration medium; and temperature and humidity control in a $CO_2$ gaseous environment.

These elements in different combinations thereof produce nanofiber media that is conformal in shape and that has a very even distribution of nanofibers across the whole surface of the support mesh. This support mesh can be composed of any number of metallic meshes including but not restricted to 20 wires per inch by 20 wires per inch (20×20), 32×32, 60×60, and the like. Furthermore, this combination in conjunction with electrospinning solutions producing nanofiber morphologies and nanofibers arranged as a plurality of nanofibers (i.e. nanofiber mat) produce a total material structure with improved air filtration properties. Filtration efficiencies≥99.97% for 0.3 micron particles at 5.3 cm/s air velocity can be achieved with an FoM>30 kPa$^{-1}$. In general, the present invention permits FoMs between 20 kPa$^{-1}$ and 80 kPa$^{-1}$ to be obtained. Furthermore, the techniques described in U.S. Ser. No. 61/734,105, noted above, can be used here to apply a negative bias to the support mesh during deposition.

These filtration properties represent improved properties as compared to that typically realized with flat sheet media.

Current Art in Electrospinning Nonwovens and Filter Media

Traditionally, aerosol filter media is made in flat sheets using processes known in the arts of textiles or wet-laid paper making. These sheet media are limited in the as far as the formation of three-dimensional shaped filtration medium. This restriction conventionally prevents the fabrication of conformal and curved/novel nanofiber fiber mat shapes. Furthermore, HEPA-grade media is often made from fiberglass which is subject to brittleness. Fiberglass media can be pleated but the pleating process creates defects at the fold, such that, although surface area is increased (thus reducing pressure drop), any defects that occur reduce the overall filter efficiency.

Figure 1B:
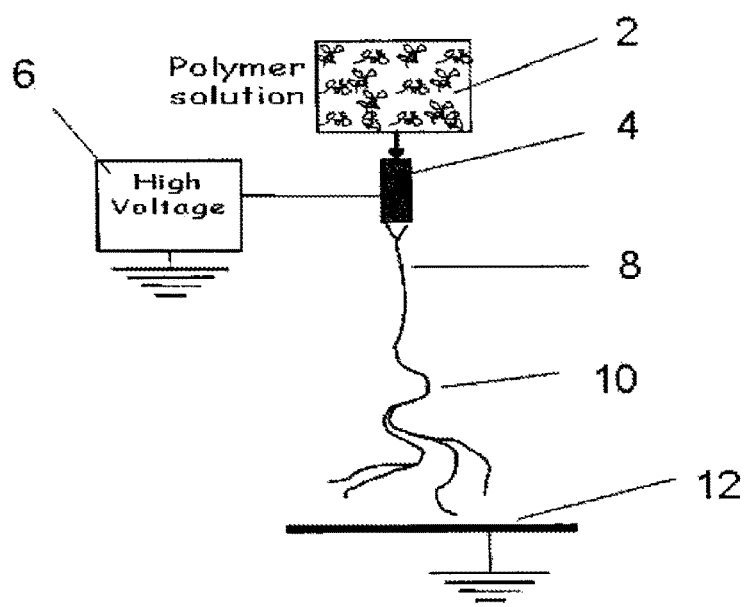
FIG. 1B is a schematic illustration of a conventional electrospinning system showing a polymer solution being electric field extracted from the tip of a charged needle.

A conventional electrospinning setup is depicted in FIG. 1B below. A polymer solution held in reservoir 2 is delivered to a needle 4 that is charged with a high voltage from high voltage source 6. The pendent drop 8 of polymer solution forms a Taylor cone and is drawn into a fiber by the voltage gradient. The drawn fiber 10 rapidly reduces in diameter and undergoes a whipping motion that further stretches and reduces the diameter of the fiber. This fiber may also divide (splay) into even smaller fibers. The fibers, typically dry at this point, are then deposited as a nonwoven mat onto a collector 12, which is typically grounded. The collector has typically been a flat plate or a cylinder. Sheets or rolls of the material are made.

Electrospinning Onto Contoured/Conformal Shapes

Previously, flat media with substantial improvement in filtration efficiency and pressure drop compared to conventional HEPA filter media were reported in U.S. Pat. No. 7,789,930. Mesh structures and controlled electrospinning conditions were used in that work. The present invention extends that work to the use of shapes that are contoured in two dimensions, for example a hemisphere (or dome). Without the present invention, one would normally view the uniform deposition of fibers on a contoured surface to present more problems than the uniform deposition of fibers on a flat surface. For example, prior to the present invention, it would be unclear the effect of accumulated charge on uniformity and if the depositing on one area of a curved shape would allow charge to bleed off from the other areas. Moreover, the need to move the electrospinning needle relative to the curved shape in order to achieve a uniform distribution of the fibers complicates the process compared to the deposition onto a flat substrate. Early experiments of depositing onto a curved surface without proper positioning and movement of the electrospinning needle relative to the curved shape produced poor fiber coverage on the contoured substrates.

In the present invention, nanofibers are electrospun onto a metallic mesh or woven substrate. The collection point of the nanofibers is non-static in that it rotates and tilts, as depicted in FIGS. 2A-2D. FIGS. 2A-2D more specifically are schematics showing the two dimensions of movement of a conformal filter media piece during fabrication of the nanofiber filtration mat. The rotation while not limited to the following sequence in one embodiment is continuous in a clockwise or counterclockwise direction while the tilt is in the range of 0-45 degrees from vertical. For the sake of explanation, the top of the dome is defined as aligned with vertical as 0 degrees and the base of the dome is perpendicular with vertical.

Accordingly, the position of a pre-shaped electrospinning deposition substrate, such as a mesh or nonwoven material, is controlled relative to an electrospinning spinneret (needle). The control is done in such a manner to achieve uniform deposition of the nanofibers onto the substrate. The preferred embodiment of this approach is to rotate the shape at a constant rate while tilting the dome, although other approaches are suitable.

Figure 2A:
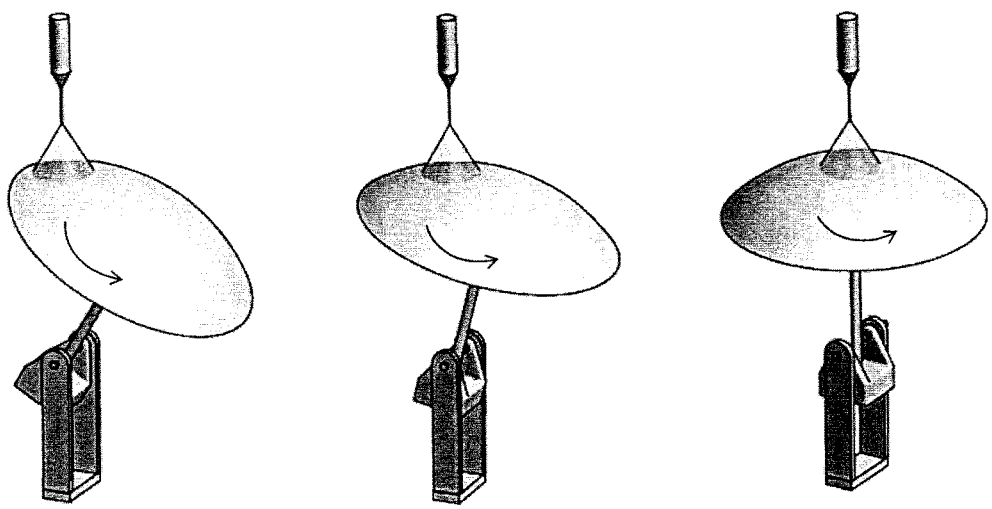
FIG. 2A is a schematic showing a cumulative set of events for the two dimensions of movement of a conformal filter media piece during fabrication of the nanofiber filtration mat.
Figure 2B:
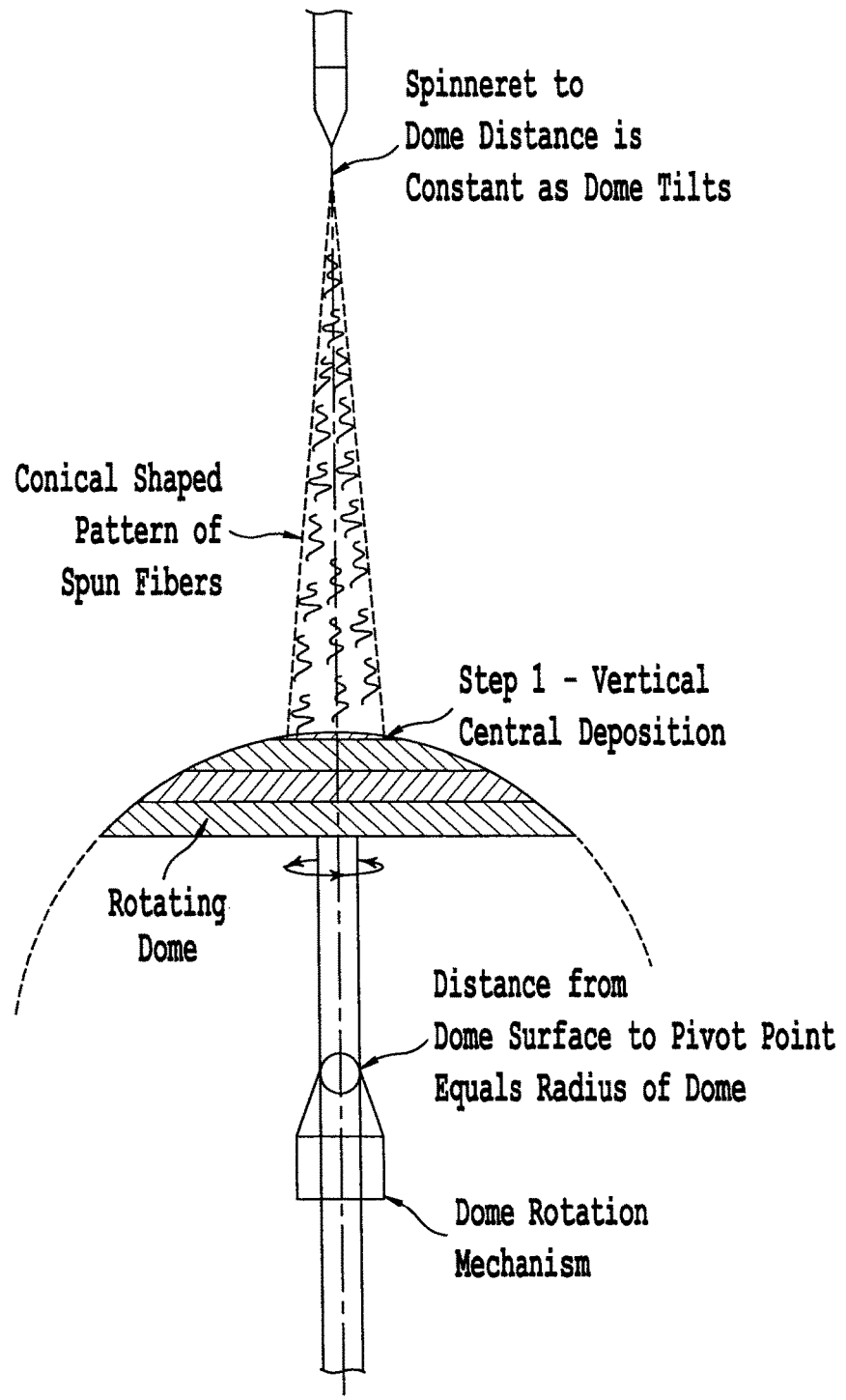
FIG. 2B is a schematic showing one step event for the two dimensions of movement of a conformal filter media piece during fabrication of the nanofiber filtration mat.
Figure 2C:
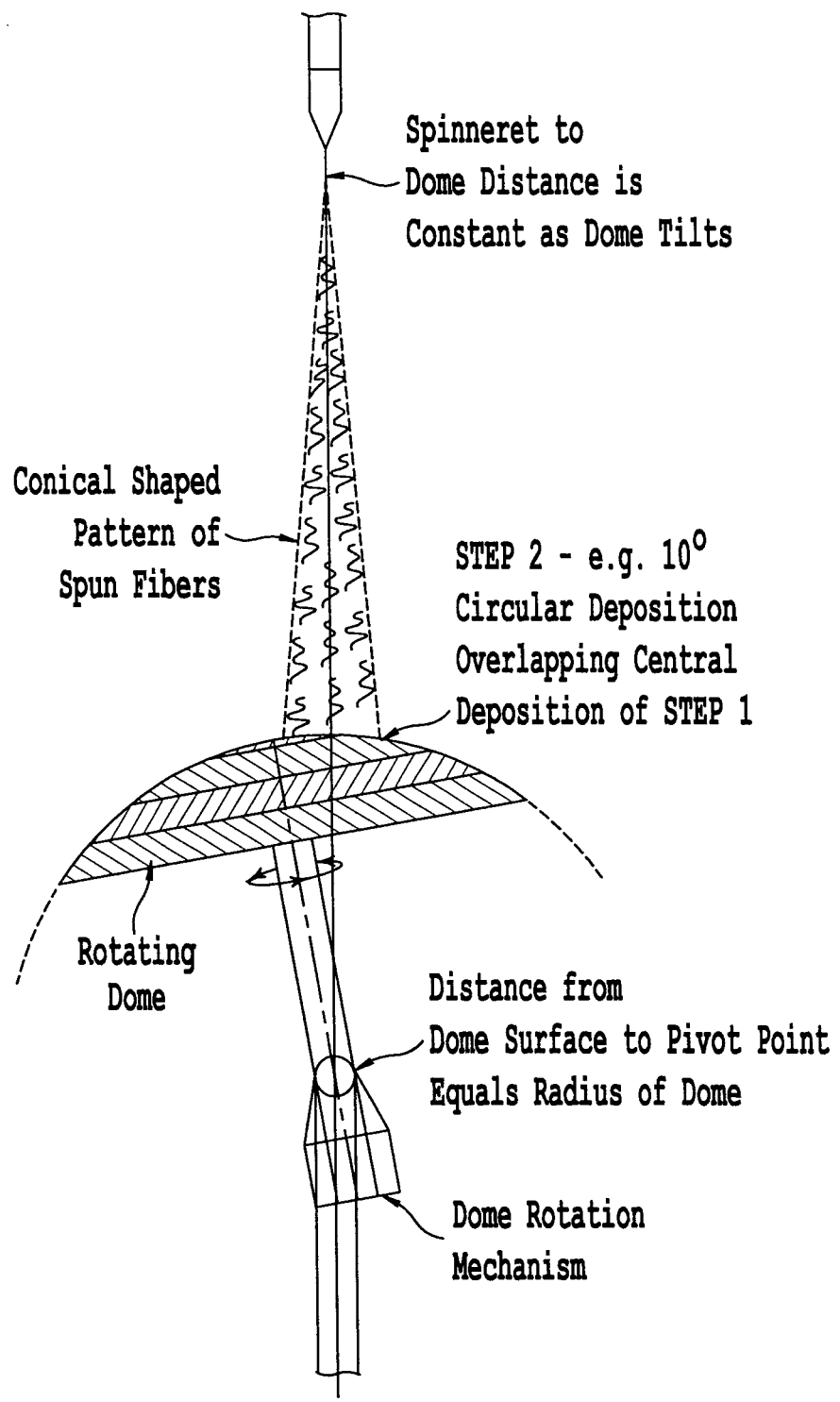
FIG. 2C is a schematic showing another step event for the two dimensions of movement of a conformal filter media piece during fabrication of the nanofiber filtration mat.
Figure 2D:
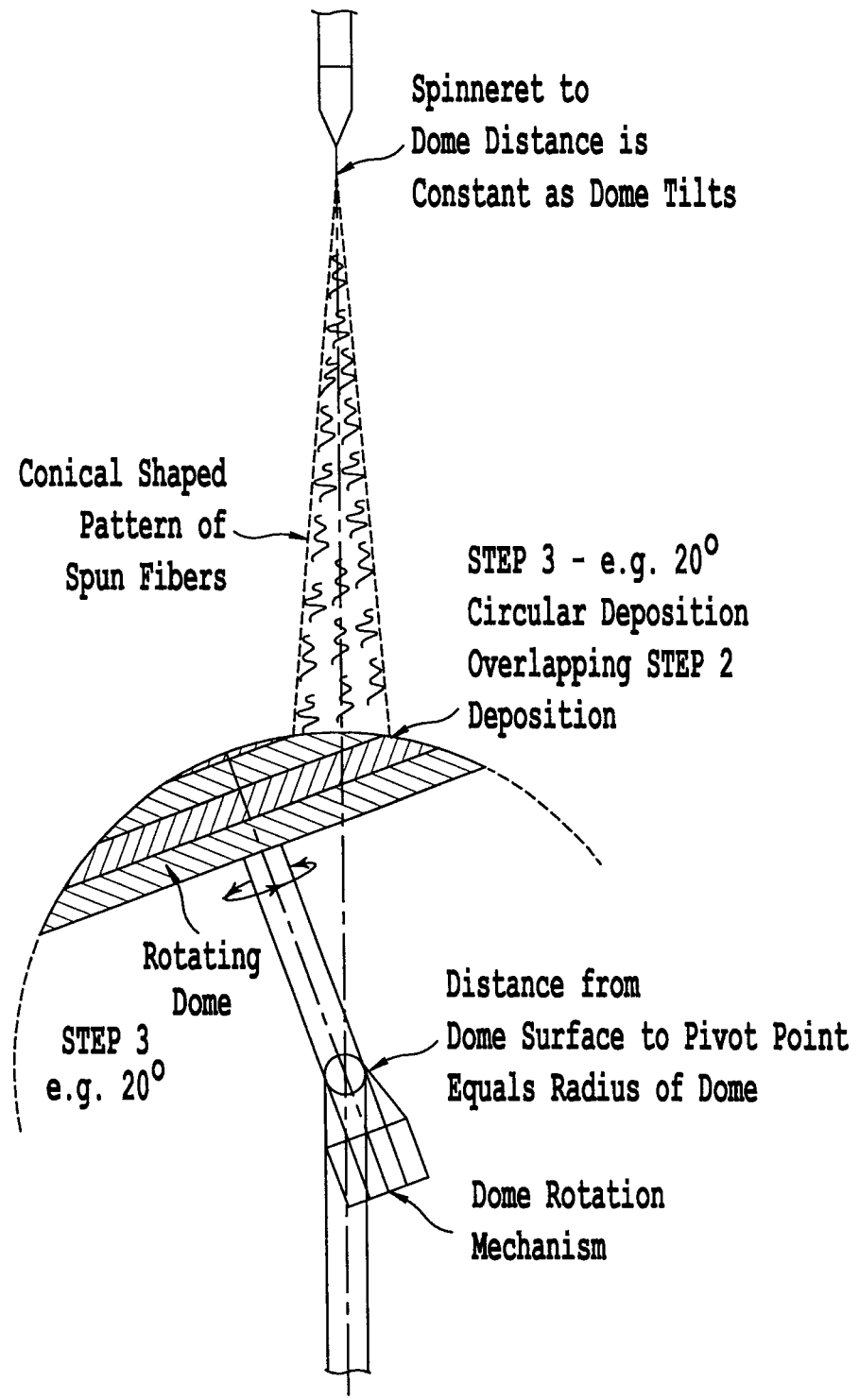
FIG. 2D is a schematic showing another step event for the two dimensions of movement of a conformal filter media piece during fabrication of the nanofiber filtration mat.
Figure 2E:
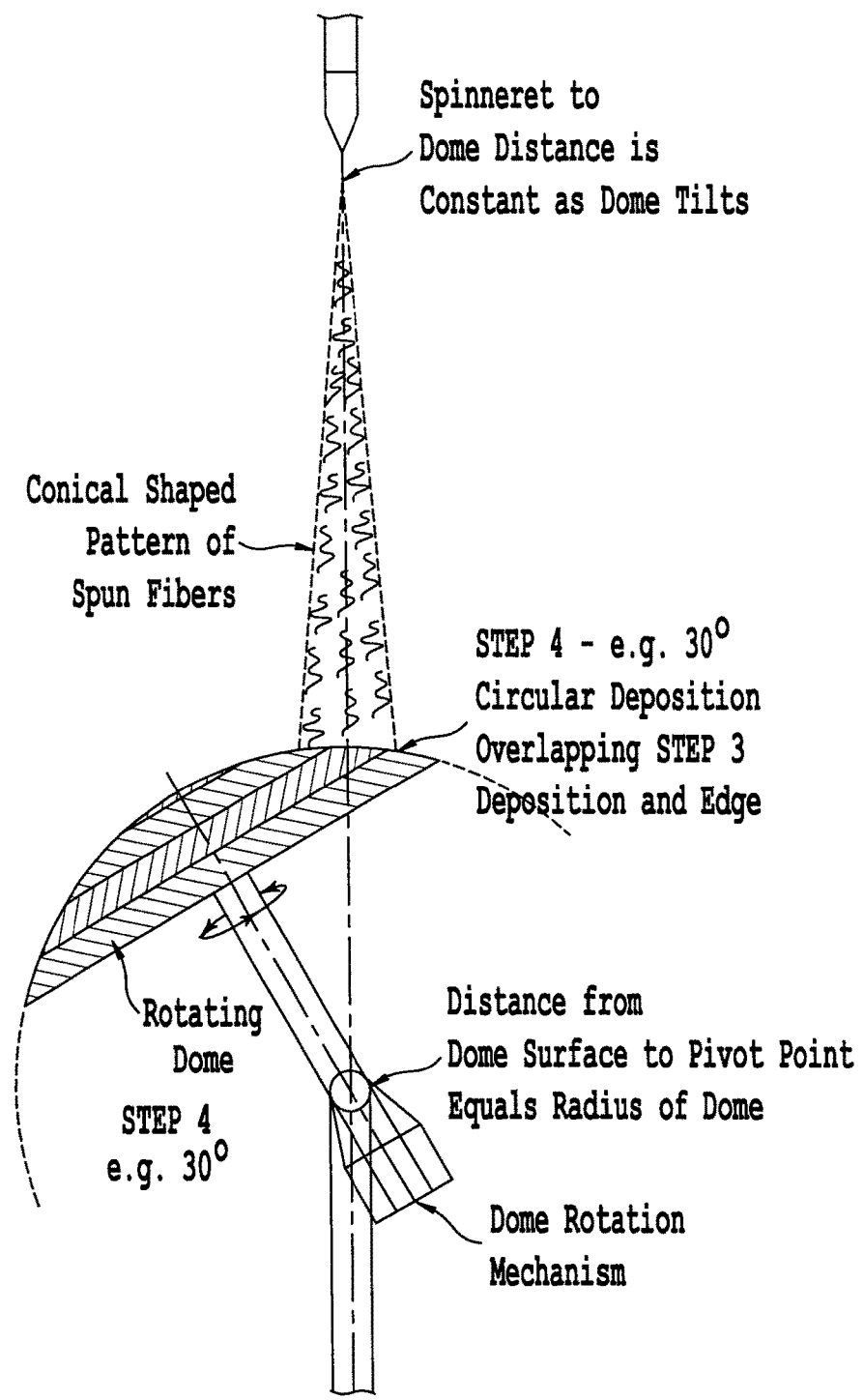
FIG. 2E is a schematic showing another step event for the two dimensions of movement of a conformal filter media piece during fabrication of the nanofiber filtration mat.

FIG. 2A is a schematic showing a cumulative set of events for the two dimensions of movement of a conformal filter media piece during fabrication of the nanofiber filtration mat. As shown more specifically in FIGS. 2B-2E, the point at which the tilt angle occurs is equal to the dome radius so that the distance between the spinneret and the dome surface remains constant as the dome is tilted. The time spent at each stepped tilt angle is such as a longer dwell time occurs at larger angles providing for consistent coverage of the nanofibers over the full surface of the shaped substrate. FIG. 2B shows the shaft supporting the contoured support in the fully vertical position; we define this angle as zero. The nanofibers travel from the spinneret to the surface (e.g. dome shaped wire mesh) they are deposited on via a roughly conical path and deposit in roughly a circular pattern. The dome rotates continuously. In this zero angle position the minimum area of the dome is exposed to the spinneret the course of a full rotation. In FIGS. 2C-2E the tilt angle is increased resulting in more area, of the dome to be exposed to the depositing nanofibers. At increasing angle the time the dome spends rotating at that particular angle increases such that any point on the surface of the dome receives equal exposure time to the depositing nanofibers.

Figure 2F:
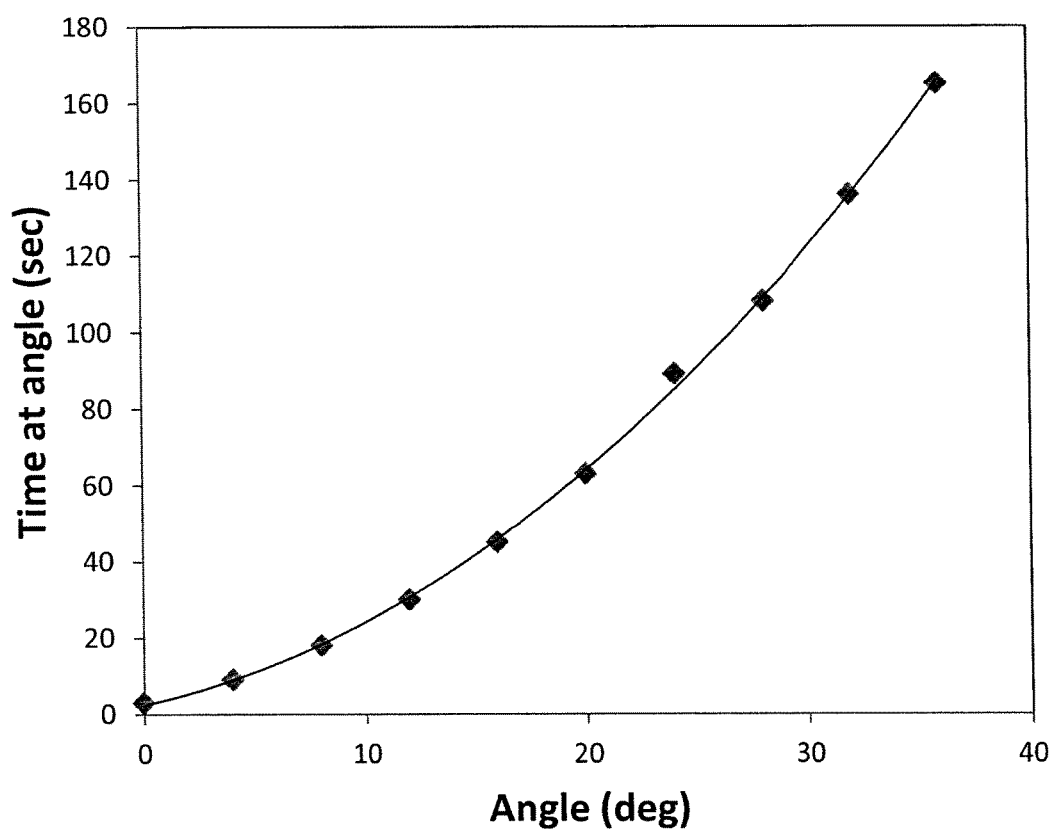
FIG. 2F is a plot of time (dwell time) at a given tilt angle.

In one embodiment, the tilting mechanism is achieved with a stepper motor. The shortest distance to the spinneret tip creates a circular path on the rotating dome which increases with tilt angle. As the angle increases from vertical, the rotating dome spends more time at that angle. Increasing dwell time for increasing tilt angle is an important aspect of this embodiment of the invention. This relationship of tilt angle to the circle path diameter is non-linear and can be approximated as a tangent relationship. A plot of time (dwell time) at tilt angle is shown in FIG. 2F. Variants of this relationship are possible but the key is providing fiber deposition time proportionate to the surface area exposed due to the tilt angle. A uniform deposition of fibers over the increasing surface area facing the electrospinning needle is achieved in the manner.

Figure 2G:
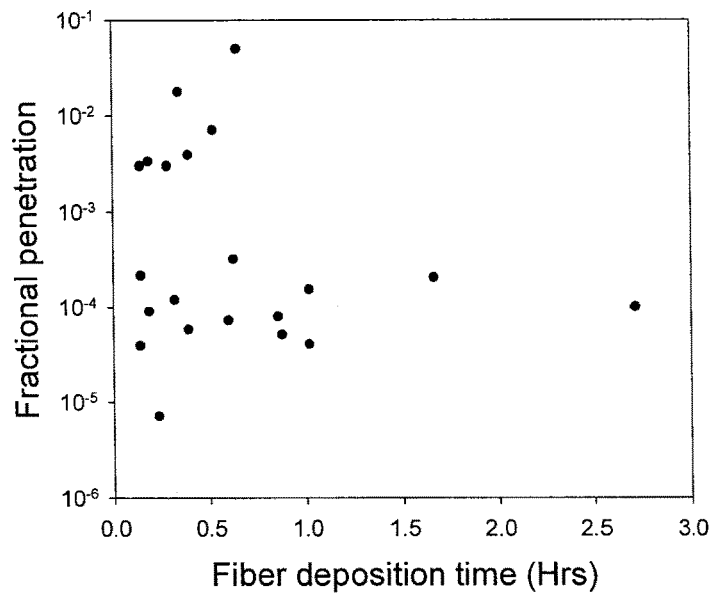
FIG. 2G is a plot of fiber deposition time in comparison to fractional penetration filter efficiency.
Figure 2H:
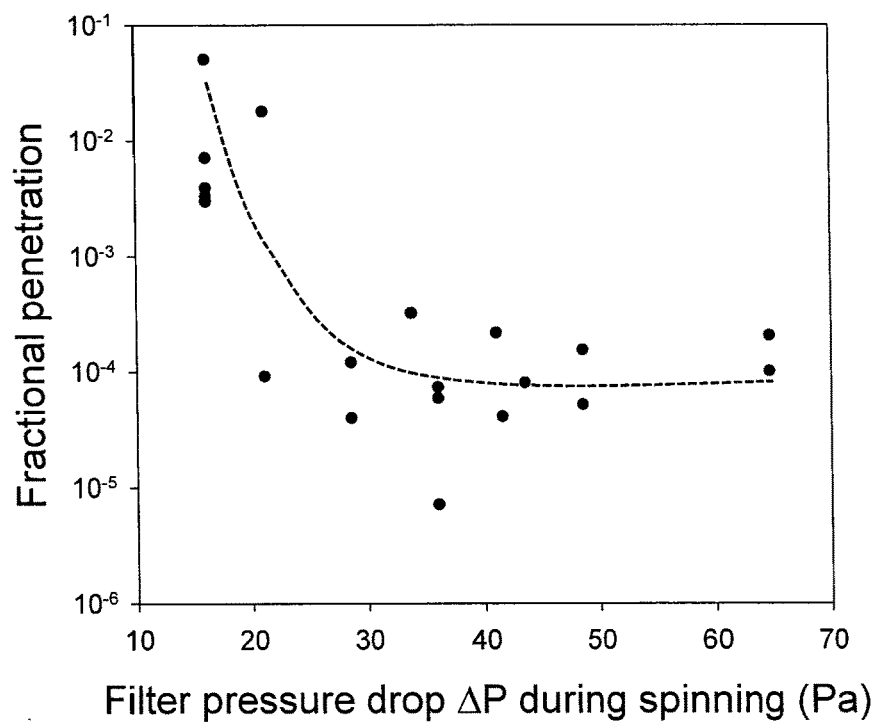
FIG. 2H is a plot of filter pressure drop during electrospinning in comparison to thickness and achieved filter efficiency.

In one embodiment of the present invention, during electrospinning of the filter media, the pressure drop across the filter is measured in real-time. This real time measurement permits real time quality assurance, and is used to determine the point at which fabrication of the filter has reached completion. FIGS. 2G and 2H show filter fractional penetration plotted as fiber deposition (electrospinning) time and as filter pressure drop. In particular, FIG. 2G is a plot of fiber deposition time in comparison to fractional penetration filter efficiency. FIG. 2H is a plot of filter pressure drop during electrospinning in comparison to thickness and achieved filter efficiency. At higher thickness (i.e., at higher pressure drops), a point of dimensioning returns is reached. The curve shown in FIG. 2H is merely a schematic guide, and is not a mathematical model. These figures show that there is little correlation between electrospinning time and filter performance. Filter pressure drop is the metric to use when determining when sufficient fibers have been deposited. Filter pressure drop is measurable during the fabrication process.

Control of the electrospinning conditions and the shape of the electric fields are important. The present invention in one embodiment controls the ambient in which the electrospinning occurs by using humidity controlled carbon dioxide flowing over the electrospinning needle. Furthermore, the temperature of the gas flowing over the needle, and hence the temperature of the polymer solution being delivered at the needle tip, can also controlled.

Figure 3:
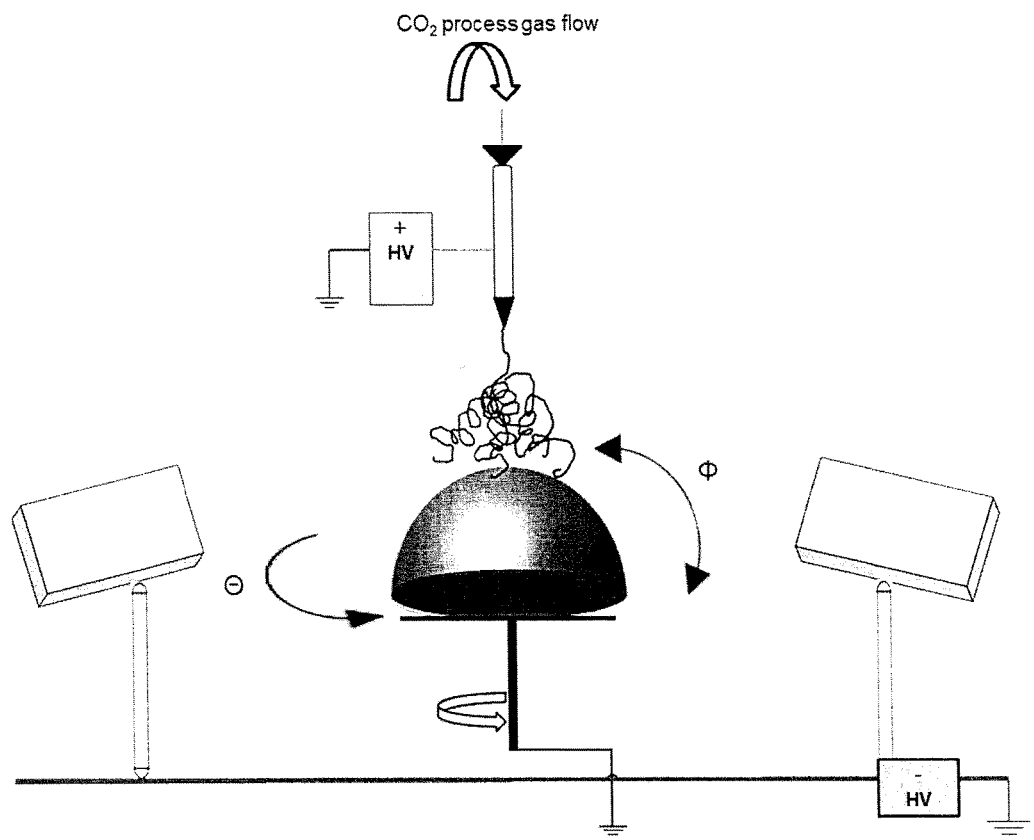
FIG. 3 is a schematic of one embodiment of the conformal electrospinning apparatus of the present invention.

In one embodiment of the present invention, the shape of the electric fields is controlled by the use of auxiliary plates with a negative potential on them and the positioning of the deposition target relative to the needle. The positioning is the above described mechanisms for controlling dome position relative to the needle. Auxiliary plates at a negative potential are used to broaden the deposition pattern of the electrospun nanofibers. One embodiment of the setup is shown in FIG. 3. FIG. 3 more specifically is a schematic of one embodiment of the conformal electrospinning apparatus of the present invention.

FIG. 3 shows a generic contoured surface 21 onto which deposition of nanofibers is taking place using the conformal deposition system. The tilting and rotating mechanism 22 is shown in more detail in FIGS. 2A-2E. The spinneret 23 is powered by high voltage supply 24, for example +10 kV to +50 kV. The spinneret is fixed while the contoured surface is moved relative to the spinneret via mechanism 22, which is grounded, to help achieve uniform coverage. Planar electrodes 100 are placed at a slight negative electrical, for example −1 kV to −7 kV. These auxiliary 100 electrodes help produce a broader shape to the overall electric field improving uniform deposition of the fibers onto the contoured surface 21 and may help collect undesirable large fibers and droplets.

Comparative Evaluations

The supports in these examples were made a medium-fine sifting mesh made from stainless steel. A variety of metallic meshes and sizes are acceptable. For the examples here a 20 wires per inch by 20 wires per inch (20×20) mesh was used. The mesh was cleaned to remove oils and surface impurities. Two types of pieces were pre-formed from the mesh: flat pieces and domed pieces. The dome pieces had a radius of curvature of 9.6 cm and a diameter of 16.5 cm. The flat pieces were bonded to a piece of 3" ID PVC pipe, while the dome pieces are bonded along the edge with a metal ring a polyurethane adhesive. A leak-proof seal was achieved with both shapes.

An electrospinning solution was prepared with 12 weight percent nylon-6 (Scientific Polymer Products) in a 2:1 mixture of acetic acid and formic acid (Sigma-Aldrich) and stirred overnight at 90 C until a clear solution was obtained. Then, the solution was allowed to cool to room temperature while stirred.

The solution was loaded into the electrospinning apparatus with a 30 G needle used in the spinneret. The distance from the needle tip to the top of the dome and the flat media was twelve inches (or 40 cm). A positive voltage of 50 kV was applied, while a negative voltage of 10 kV was applied to the negative potential grids. The Relative humidity was maintained at an average of 32.5 percent. The polymer electrospinning solution was provided to the needle at an average temperature of 21.3 degrees centigrade, and injected into the electrospinning chamber at a flow rate often liters per minute. Exit relative humidity and temperature was measured downstream of the filter. Average exit relative humidity level of 26.2 percent and temperature of 21.4 C were measured.

After fabrication, the filter media was placed in a vapor bath of isopropyl alcohol overnight to remove residual electrostatic charge on the fibers. The filters (flat and domed) were then tested with a polydisperse aerosol of KCl with a mean diameter of 0.22±18 μm in a filter testing system. The testing system uses a TSI constant output atomizer, a Kr85 charge neutralization source, and careful mixing of the aerosol upstream and downstream of the filter. The penetration (Pt=total counts downstream of filter/counts upstream of filter) is recorded for a face velocity of 5.3 cm/s using a HS—LAS (High Sensitivity—Laser Aerosol Spectrometer) by Particle Measurement Systems. The pressure drop across the filter is measured with a TSI DP pressure drop measurement instrument. Filter media performance is judged by the particle penetration or efficiency (Pt=1−fractional efficiency) of 0.3 micron particles at 5.3 cm/s and the recorded pressure drop. Filter figure of merit (FoM) was also calculated, FoM=−log(Pt)/ΔP, where pressure is in the units kPa. Flat sheet fiberglass filter media has a FoM=12±2 $kPa_{-1}$ and particle efficiency of 99.97% at 0.3 micron.

Figure 4A:
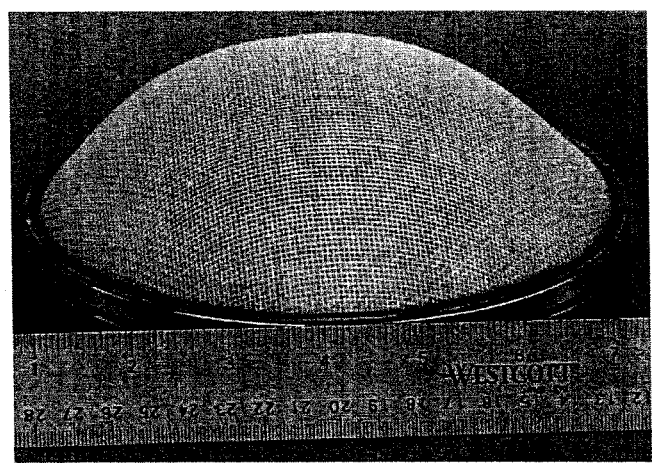
FIG. 4A is photographic image of a dome shaped filter media according to one embodiment of the present invention.

FIG. 4A shows a picture of a dome shaped filter media with HEPA efficiency at 0.3 μm. The nanofibers are sufficiently small that the interaction of visible light with the fibers is minimal so that the material is semi-transparent.

Table 1 shows performance of flat sheet media layered to achieve high efficiency. Table 2 shows the performance of high efficiency dome media that is not layered.

TABLE 1

| Filter ID | FoM (kPa$^{-1}$) | Efficiency | ◆P (Pa) |
|---|---|---|---|
| 20101221-RY-23 & 20101221-RY-22 | 31.2 | 99.98% | 116.4 |
| 20110105-RY-14 & 20110105-RY-15 | 42.4 | 99.993% | 97.7 |
| 20110105-RY-16 & 20110105-RY-18 | 36.1 | 99.987% | 107.6 |
| 20110111-RY-16 & 20110111-RY-18 | 29.9 | 99.98% | 121.6 |
| 20110113-RY-13 & 20110113-RY-15 | 43.0 | 99.97% | 81.5 |
| AVERAGE | 36.5 | 99.980% | 105.0 |

TABLE 2

| Filter ID | FoM (kPa$^{-1}$) | Efficiency | ΔP (Pa) |
|---|---|---|---|
| 20110107-RY-11 | 35.8 | 99.990% | 111.6 |
| 20110107-RY-12 | 58.6 | 99.9999% | 101.2 |
| 20110114-RY-12 | 45.8 | 99.998% | 103.5 |
| 20110310-RY-11 | 43.8 | 99.9992% | 115.8 |
| 20101213-RY-11 | 47.0 | 99.981% | 88.4 |
| AVERAGE | 46.2 | 99.994% | 104.1 |

The dome shaped media is able to achieve comparable or better filtration efficiency but in a single layer compared to the stacked flat media.

As noted above, in the present invention, instead of the traditional process of making nonwovens as flat sheet media followed by post processing of the media to form the desired end product shape, a method is provided that produces nonwoven pieces shaped in the final product form. One useful shape illustrated above is that of a dome.

Figure 4B:
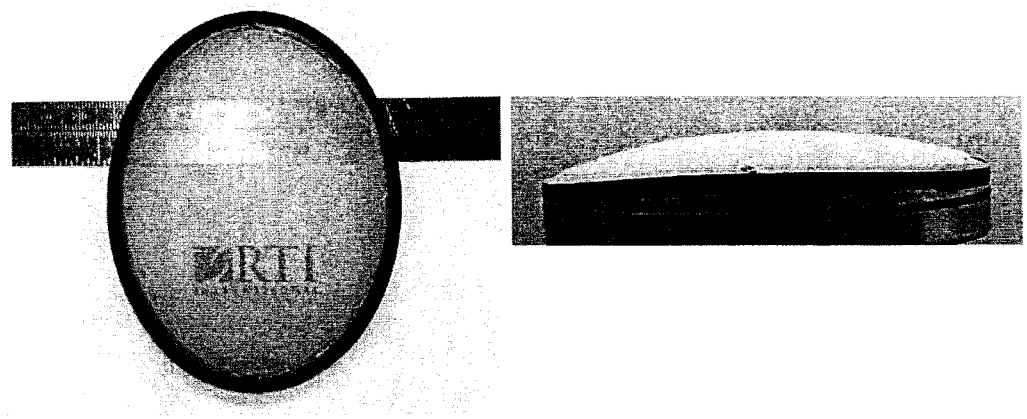
FIG. 4B is photographic image of curved oval shaped filter media according to one embodiment of the present invention.

Other shapes besides the simple dome shape are possible. FIG. 4B shows an example of the deposition of fibers using the techniques described above onto curved oval construct. In this demonstrative example, a fine mesh was used (60× 60) to support the nanofibers. An integrated gasket was formed on the edge of the supporting mesh and the nanofibers deposited conformally using a system such as the one illustrated in FIG. 3. Contoured shapes such as the ones shown in FIGS. 4A and 4B could be used to make filter canisters that are conformal to the face or head for improved conform, freedom of motion, or reduced visual interference while wearing the protective device. For example, filter pieces similar to those disclosed in U.S. Pat. Nos. 7,311,764 and 8,262,782, the entire contents of which are incorporated herein by reference.

Figure 4C:
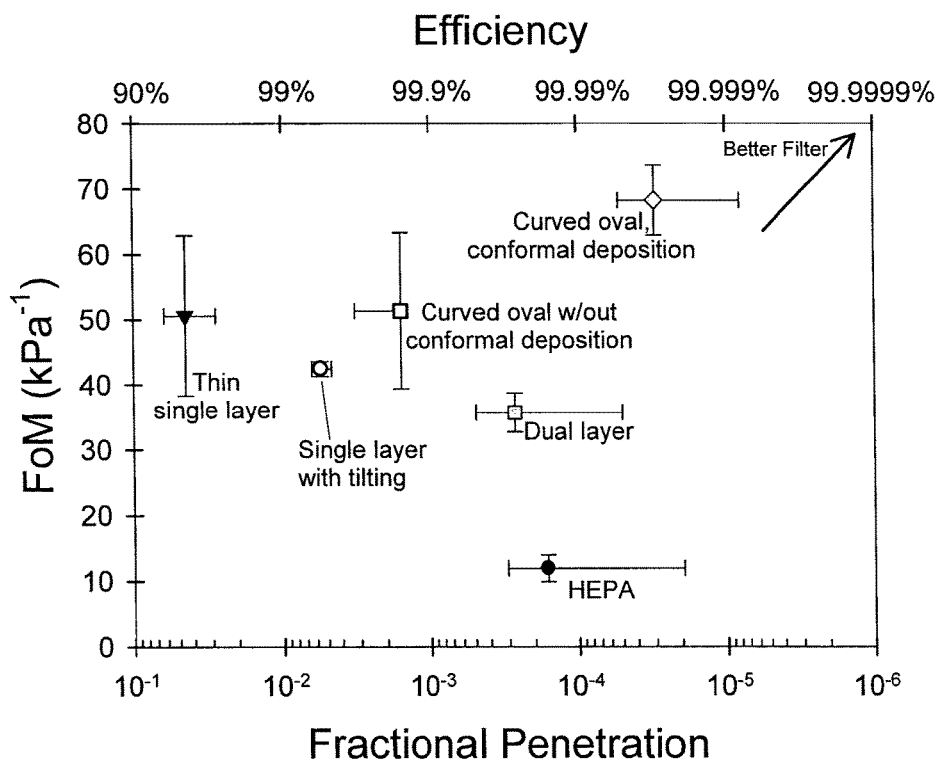
FIG. 4C is a depiction of the filtration performance advantages of conformally deposited nanofiber filter elements.

FIG. 4C is a depiction of the filtration performance advantages of conformally deposited nanofiber filter elements. This depiction shows the performance of a variety of filter media samples are plotted in a plane of FoM versus Pt. This plot is in essence the effectiveness of filtration obtained for the level of protection provided. A filter media with high efficiency (i.e. low Pt) and high FoM is able to pro vide a high level of protection with minimal burden (e.g. easier to breathe through and/or smaller size). The individual data points and error bars represent the averaged and standard deviation of a number of samples tested with 0.3 μm KCl aerosol particles with a face velocity of 5.33 cm/s.

With regard to the "curved oval conformal deposition" data points of FIG. 4C, there are two data sets one for filter samples made with the conformal deposition system and one without the conformal deposition system. For the case of without conformal deposition, the tilting mechanism was turned off, and the filter made to the same pressure drop specification as the one with the conformal deposition system. Samples of curved oval filters made with the conformal deposition provide significantly better filtration efficiency and FoM. This improvement is likely due to a much more uniform deposition of the fibers and a reduction in defects (e.g. pin holes, edge leaks, etc.).

With regard to the "single layer" filter media data, there are three data sets given where the deposition system and media thickness (pressure drop of filter media at termination of fabrication, see FIG. 2G) were varied. These thin filter media were made with the same polymer solution as the curved oval data but were composed of a planer metal mesh. In all cases, the filter face velocity is maintained thus removing surface area considerations. The thin single layer filter media can be stacked to form a dual layered filter with higher efficiency. However, there is slight decrease in the FoM.

Stacking of the filter media does not achieve the performance realized by the curved oval media that were made with the conformal deposition process. Interestingly, if a single layer flat filter is made with the tilting system used with the curved oval (conformal deposition), an improvement in filtration efficiency is observed with no statistical difference in FoM. It is likely that the fibers were deposited more uniformly, thus reducing defects. Furthermore, with the tilting system, only one part of the filter is being deposited on at any point in time. The "rest" time for the other areas of the filter may result in excess charge bleeding off of the forming filter, thus reducing degradation of the voltage gradient needed for good formation of nanofibers via electrospinning.

Commercial fiberglass HEP A media is included on the plot of FIG. 4C to show the substantial improvement in performance of the nanofiber filter media compared to conventional high efficiency filtration media.

Making Contoured Mesh Supports

As illustrated above, a support mesh is first shaped into the desired final shape, e.g. a dome, and formed into a freestanding piece. Nanofibers are then deposited onto the pre-shaped support mesh to form a nonwoven nanofiber material on a mesh support. The present invention is not limited to any exact method of forming the dome or other conformal shapes and several methods were used. One method used was to create a strip of mesh that is also curved, and then deposit the nanofibers onto the surface. This method did not have the ability to measure the pressure drop of the forming filter and did not have the ability to tilt the substrate relative to the needle, although this approach is still useful. In another method, as noted above dome shaped filter pieces of various radii of curvature can be created. The domes use a hemi-sphere template and constraining the edge of the mesh to achieve the dome shape. The nanofibers are deposited on the dome with real time measurement of pressure drop during electrospinning and the method of moving the dome surface relative to the electrospinning needle. In another method, as shown in FIG. 4B, a curved oval shape was developed. This shape was made using a press-and-cavity mold where the mold forces the mesh into the desired shape, and then a polyurethane material is injected into a space around the perimeter forming the support and gasket. In one embodiment of this invention, electrospinning onto the curved oval shape uses the real time pressure drop and system for controlling the deposition used with the dome shape.

Traditionally, electrospinning is done in such a manner that the fibers are deposited on either a planer surface or a cylinder. The product is a sheet, a roll, or tube of nanofiber material, typically on a backing or substrate material. The nanofiber material is then either used in a sheet or tube configuration or further manipulated starting with the sheet media to produce a desired product. For example, sheets of nanofiber media are pleated and formed into an air filter that is rectangular in shape.

There are two aspects to the invention: (1) conformal shapes such as a hemisphere (or dome) and related shapes that could fit conformally to an object such as the face and (2) one-step production of final shaped filtration devices as opposed to making sheet media followed by manipulation to produce the final shape.

Contoured Shaping:

As noted above, the support mesh can be formed into a hemispherical shape, or dome, and held in place using a support wire and a curable polymer compound to form an elastomeric edge. The dome-shaped support mesh is held by a chuck which allows handling of the support mesh and deposition of the nanofibers onto this pre-shaped mesh.

To make the dome shape or other "contoured" shape, a wire mesh or other suitable material is placed over a jig; a mold having the desired radius of curvature is pressed into the jig with the mesh held between the two.

Figure 5:
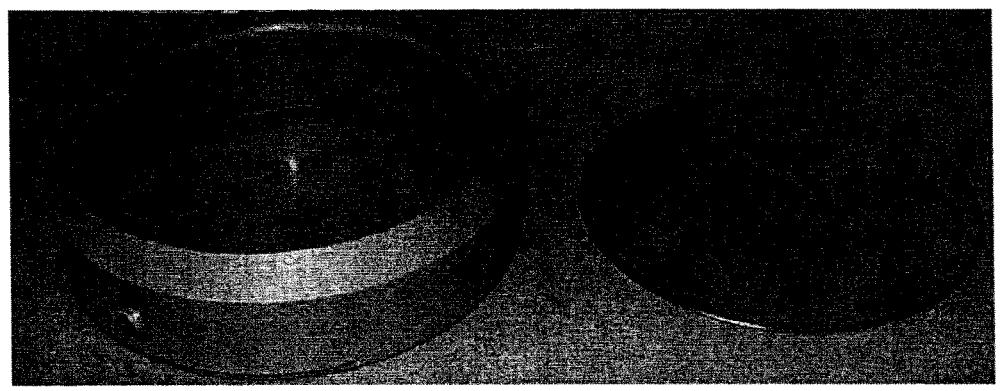
FIG. 5 is composite photographic image of a jig (left) and dome mold (right)

FIG. 5 is composite photographic image of a jig (left) and dome mold (right). The mesh is then shaped into the desired hemisphere with the desired radius of curvature. In this image, the mesh sits on the ring, and the press piece is on the right (dome) and forces the mesh into a dome shape. The excess is trimmed off and then transferred to the chuck with the edge pressed into the groove on the chuck.

Figure 6A:
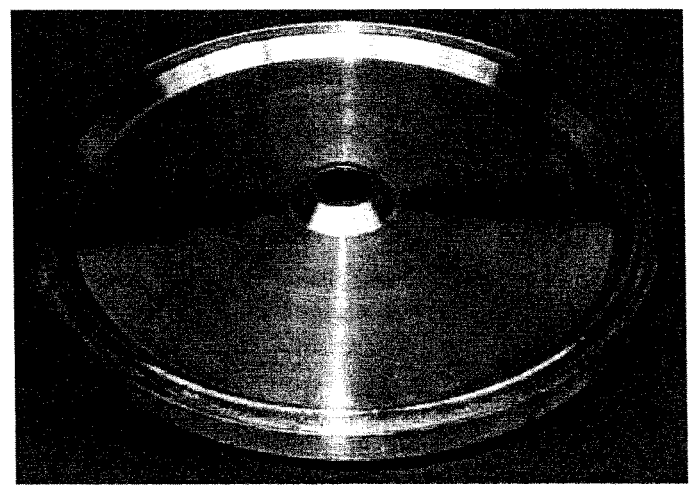
FIG. 6A is a composite photographic image of the chuck (no mesh present) showing the groove where the edge of the shaped mesh is pressed into.
Figure 6B:
FIG. 6B is composite photographic image (close up) with the mesh pressed into the groove.

FIG. 6A is composite photographic image of the chuck (no mesh present) showing the groove where the edge of the shaped mesh is pressed against. FIG. 6B is composite photographic image (close up) with the mesh pressed into the groove. In some cases, depending upon the radius of curvature and the height of the dome being formed, a temporary retaining piece is needed to hold the shaped mesh in place during the fabrication process, the edge of this is visible in FIG. 6B.

A retaining wire is then placed into the groove and a suitable glue or polymer poured into the groove. Two or single component adhesives that cure upon application of heat, UV, water moisture, initiator, etc are suitable. One example is a two component polyurethane, that is one part resin and one part crosslinker. The adhesive is measured out, mixed, and poured into the groove. Curing can be accelerated via baking in an oven. The final product is a free standing, dome-shaped support mesh. A variety of radii of curvature and heights are possible. Even shapes that are not strictly hemispherical in shape are possible, such as an oval which is a geometric slice of a dome. In the cases of shapes not strictly hemispherical, variation of the fabrication method is required such as a more complex mold which is clamshell shaped to mold the mesh into the correct shape and provide for formation of the polymer supported edge.

Conformal Fiber Coat:

Once the support mesh is formed, the present invention involves the use of these shapes that are contoured in two dimensions, for example a hemisphere (or dome) as a collector of nanofibers. Nanofibers are electrospun onto an articulated, pre-shaped metallic mesh or woven substrate. The collection point of the nanofibers moves as the substrate rotates and tilts, as depicted in FIGS. 2A-2D. As noted above, the tilting mechanism, is achieved with a stepper motor and is exponentially correlated to the rotation of the substrate in such a way that as the angle increases from vertical the rotating dome spends more time at that angle. A uniform deposition of fibers over the increasing surface area facing the electrospinning needle is achieved.

In one embodiment of the invention, as noted above, the substrate is sealed around the edges to a chuck that holds the substrate and provides the rotation and tilt motion described above. Process gasses flow through the substrate and forming nanofiber coating via a tube located in the center of the chuck. In one embodiment, the assembly is grounded and able to freely move without loss of contact with earth ground or break the seals providing for transport of process gasses through the forming nanofiber material. The pressure drop across the forming nanofiber material can be monitored in real-time providing indication of the formation of the nanofiber layer on the substrate, as discussed above.

Moreover, control of the gaseous environment for the electrospinning improves the quality of the fibers electrospun with regards to the distribution of nanofiber diameter and with regards to producing smaller diameter nanofibers. For example carbon dioxide, sulfur hexafluoride, and freons, and gas mixtures including vapor concentration of solvents, ions, and/or charged particles, when injected into the electrospinning system improve the quality of electrospun fibers (i.e., the fibers are smaller in diameter and have a closer distribution of diameter sizes).

By modifying the gaseous environment surrounding the capillary, the present invention in one embodiment permits increases in the applied voltage and an improved pulling of the liquid jet from the capillary. In particular, electronegative gases appear to reduce the onset of a corona discharge around the capillary thus permitting operation at higher voltages enhancing the electrostatic force. The formation of corona around the capillary would disrupt the electrospinning process. Further, according to the present invention, insulating gases will reduce the possibility of bleed-off of charges in the Rayleigh instability region, thereby enhancing the stretching and drawing of the fiber. Cross-referenced related pro visional application U.S. Pat. No. 7,297,305, entitled "Electrospinning in a Controlled Gaseous Environment," contains further details of controlling and modifying the gaseous environment during electrospinning.

As described in the '305 patent and also suitable for the present invention, the drying rate for the electrospun fiber during the electrospinning process can be adjusted by altering the partial pressure of the liquid vapor in the gas surrounding the fiber. Retarding the drying rate would be advantageous because the longer the residence time of the fiber in the region of instability the more prolonged is the stretching, and consequently the smaller the diameter of the resultant fiber. The height of the containment chamber and separation of the capillary at high DC voltage from the ground need, according to the present invention to be compatible with the drying rate of the fiber. Also the DC voltage is preferably adjusted to maintain an electric field gradient of about 3 KV/cm.

As illustrative of the electrospinning process of the present invention, the following non-limiting examples are given to illustrate selection of the polymer, solvent, extrusion element to collection surface separation, solvent pump rate, and addition of electronegative gases. One illustrative example for selection, according to the present invention, of polymer, solvent, extrusion element, collection surface separation, solvent pump rate, and addition of electronegative gases is given below:

a polymer solution of a molecular weight of 350 kg/mol,
a solvent of dimethylformamide DMF,
an extrusion element tip diameter of 1000 μm,
an Al plate collector,
~0.5 ml/hr pump rate providing the polymer solution,
an electronegative gas flow of CO2 at 8 lpm,
an electric field strength of 2 KV/cm, and
a gap distance between the tip and the collector of 17.5 cm.

A decreased fiber size can be obtained by increasing the molecular weight of the polymer solution to 1000 kg/mol, and/or introducing a more electronegative gas (such as for example Freon), and/or increasing gas flowrate to for example 20 lpm, and/or decreasing the tip diameter to 150 μm (e.g. as with a Teflon tip).

Thus, the gaseous environment surrounding the extrusion elements during electrospinning influences the quality of the fibers produced. Blending gases with different electrical properties can be used to optimize performance. One example of a blended gas includes $CO_2$ (at 4 lpm) blended with Argon (at 4 lpm).

Further, when a solvent such as methylene chloride or a blend of solvents is used to dissolve the polymer, the rate of evaporation of the solvent will depend on the vapor pressure gradient between the fiber and the surrounding gas. The rate of evaporation of the solvent can be controlled by altering the concentration of solvent vapor in the gas. The rate of evaporation affects the Rayleigh instability. In turn, the electrical properties of the solvent and its vapor influence the electrospinning process. For example, by maintaining a liquid solvent pool at the bottom of a chamber, the amount of solvent vapor present in the ambient about the electrospinning is controlled by altering the temperature of the chamber and/or pool, and thus controlling the partial pressure of the solvent in the gaseous ambient about the electrospinning. Having a solvent vapor in the electrospinning chamber affects the drying rate of the fibers, and alters the fiber surface characteristics when a solvent other than the one used in spinning solution is used in the chamber.

Figure 7:
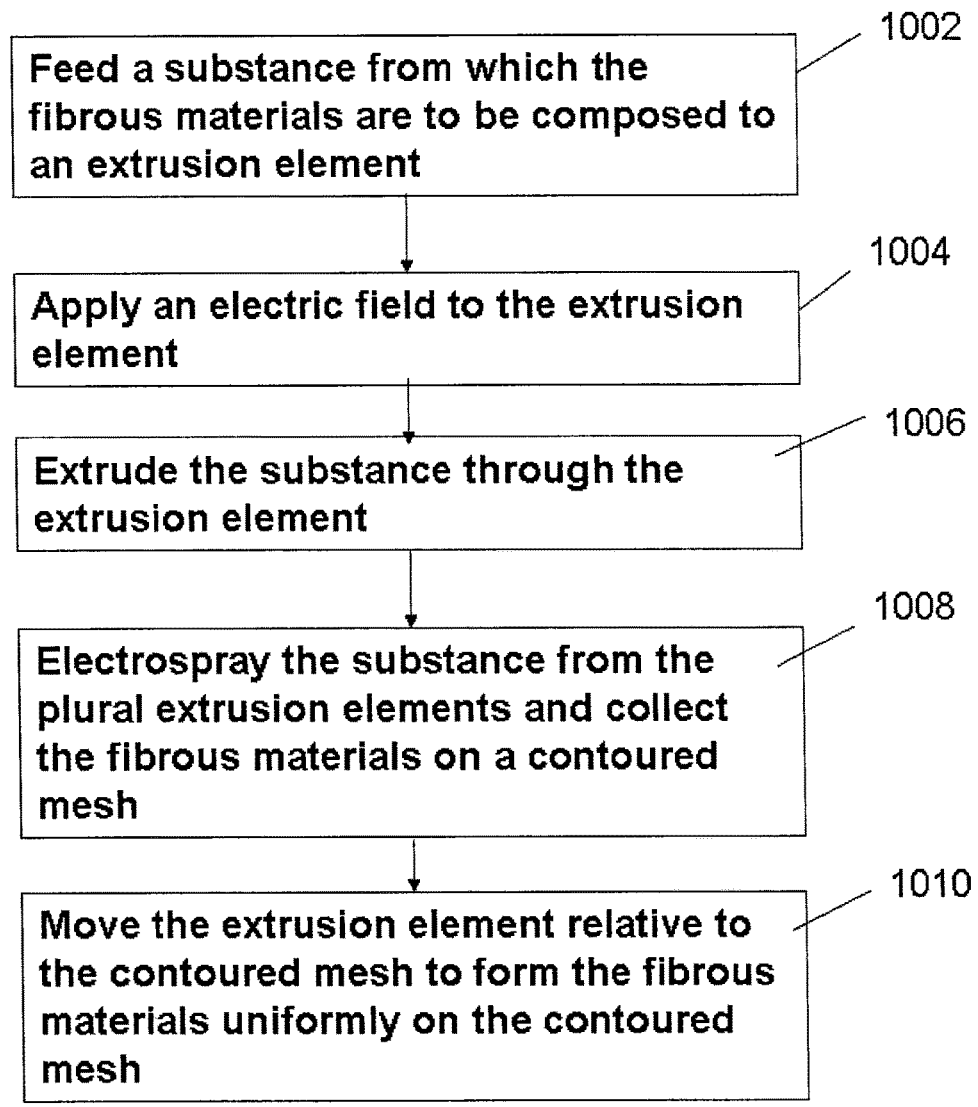
FIG. 7 is a flowchart depicting one illustrative method of the present invention.

Thus, the present invention provides various apparatuses and methods for producing fibrous materials. As depicted in FIG. 7, the illustrative method at step 1002 feeds a substance from which the fibrous materials are to be composed to an extrusion element, at step 1004 applies an electric field to the extrusion element, at step 1006 extrudes the substance through the extrusion element, at step 1008 electrosprays the substance from the plural extrusion elements and collects the fibrous materials on a contoured mesh; and at step 1010 moves the extrusion element relative to the contoured mesh to form the fibrous materials uniformly on the contoured mesh.

The electrospraying can electrospin the extruded substance from the extrusion element to form fibers or nanofibers on the contoured mesh. The electrospraying preferably occurs in an electric field strength of 2,000-400,000 V/m. The fibrous materials electrosprayed from the extrusion elements are collected on a collector. The fibers produced can be nanofibers.

The fibers and nanofibers produced by the present invention include, but are not limited to, acrylonitrile/butadiene copolymer, cellulose, cellulose acetate, chitosan, collagen, DNA, fibrinogen, fibronectin, nylon, poly(acrylic acid), poly (chloro styrene), poly(dimethyl siloxane), poly(ether imide), poly(ether sulfone), poly(ethyl acrylate), poly(ethyl vinyl acetate), poly(ethyl-co-vinyl acetate), poly(ethylene oxide), poly(ethylene terephthalate), poly(lactic acid-co-glycolic acid), poly(methacrylic acid) salt, poly(methyl methacrylate), poly(methyl styrene), poly(styrene sulfonic acid) salt, poly(styrene sulfonyl fluoride), poly(styrene-co-acrylonitrile), poly(styrene-co-butadiene), poly(styrene-co-divinyl benzene), poly(vinyl acetate), poly(vinyl alcohol), poly(vinyl chloride), poly(vinylidene fluoride), polyacrylamide, polyacrylonitrile, polyamide, polyaniline, polybenzimidazole, polycaprolactone, polycarbonate, poly(dimethylsiloxane-co-polyethyleneoxide), poly(etheretherketone), polyethylene, polyethyleneimine, polyimide, polyisoprene, polylactide, polypropylene, polystyrene, polysulfone, polyurethane, poly(vinylpyrrolidone), proteins, SEBS copolymer, silk, and styrene/isoprene copolymer.

Additionally, polymer blends can also be produced as long as the two or more polymers are soluble in a common solvent. A few examples would be: poly(vinylidene fluoride)-blend-poly(methyl methacrylate), polystyrene-blend-poly(vinylmethylether), poly(methyl methacrylate)-blend-poly(ethyleneoxide), poly(hydroxypropyl methacrylate)-blend poly(vinylpyrrolidone), poly(hydroxybutyrate)-blend-poly(ethylene oxide), protein blend-polyethyleneoxide, polylactide-blend-polyvinylpyrrolidone, polystyrene-blend-polyester, polyester-blend-poly(hyroxyethyl methacrylate), poly(ethylene oxide)-blend poly(methyl methacrylate), poly (hydroxystyrene)-blend-poly(ethylene oxide)).

In addition, polymers dissolved in solvents that also have non-polymer organic or inorganic compounds dissolved in it and polymers dissolved in solvents that also have non-polymer organic or inorganic insoluble particles suspended in it can be produced.

In some cases, post treatment annealing could be used to "carbonize" some or all of the deposited fibers.

Product Applications

In the art of fabricating nanofiber filter media, the processes used typically generate media in roll-to-roll processes, as flat sheets, or as sheets wrapped around a drum (e.g., cylinder). In the processed used in this invention, nanofibers are deposited onto surfaces curved in two dimensions (i.e. a cylinder is curved in only one direction) such as a dome.

In the art of filter canister making, as for respirators, flat sheet media is shaped in to cylindrical or cubical shapes and fashioned into a housing or holder. In the last decade, new shapes such as slightly curved shapes that fit better to the face have been made. However, these shapes are still limited in the radius of curvature and complexity of the filter shape that can be produced. Conformal shapes that could fit tight to the head or face would permit larger freedom of design such that the filter does not obstruct the motion or view of the user. Other novel shaped filters will provide greater design freedom in other applications such as protecting equipment.

FIG. 8 depicts various filter elements where the techniques of the present invention would be used to form contoured and/or conformal filters. The gas mask filter is fitted to the head and shoulders of a user. U.S. Pat. No. 7,934,487 to Grove et al, the entire contents of which are incorporated herein by reference, describes respiratory masks, or more particularly modular respiratory masks that offer protection from hazardous chemical and/or biological warfare agents and the like. The techniques of Grove et al. to seal the helmet assembly to the user are applicable here in the present invention.

Accordingly, in one embodiment of the present invention, there is provided a helmet-mask assembly which includes a helmet, a face protection assembly, and a transparent, impact resistant lens. The helmet is made of an impact resistant material for protecting the user's head. The face protection assembly, which can be attached and detached from, the helmet, includes a face protection shell which is also made of an impact resistant material, for protecting the head and face of the user. The shell includes a vision port through the shell at the level of the eyes of a user, through which a transparent lens can be positioned for protection of the user's eyes. The face protection assembly includes a flexible nose-cup assembly within the shell and flexible face seal on an inner surface of the shell. The flexible nose-cup assembly includes the contoured filter assemblies of the present invention and is positioned to engage the mouth and nose of the user. Alternatively, the nose-cup assembly includes a breathe-through airflow assembly and filter unit where the contoured filter assemblies of the present invention are placed. The flexible face seal is disposed on an inner surface of the shell around the nose-cup assembly and the lens, such that the face seal engages the face of the user. A strap or harness is attached to the shell or face seal, for adjustably securing the face seal and nose-cup to the user's face to maximize comfort and protection while preventing fogging of the lens.

Other applications where the contoured filter assemblies of the present invention would be of utility include filters for engine compartments where space is a premium, such as for example inside crowded car engine compartments or on motorcycle engines.

In another application, the contoured filter assemblies would be used in respirators for escape masks. A person exiting a burning building, where smoke inhalation would present issues to their health, could strap on a high efficiency escape mask of this embodiment. The contoured filter assembly would better fit to the features of a person's face with minimal seal material.

In another application, the contoured filter assemblies would be used in hospital settings where the weight, complexity, and viewing obstruction of a standard respirator often impede acceptance of respirator wear.

Generalized Aspects of the Invention

The following numbered statements represent the generalized aspects of this invention.

Statement 1. A filtration device comprising a contoured support having 1) an interior surface, 2) an outside peripheral surface spaced farther from a center of the contoured support than the interior surface, and 3) a rim enclosed and sealed to a perimeter of the contoured support; macroscopic openings in the contoured support extending from the interior surface to the outside peripheral surface; and a plurality of nanofibers having diameters less than 1 micron, disposed on the outside peripheral surface of the contoured support, and covering the macroscopic openings to form a filtration medium on the contoured support.

Statement 2. The device of statement 1, wherein the contoured support comprises a wire mesh support.

Statement 3. The device of statement 1, wherein the rim comprises a polymeric member which forms a seal for attachment of the contoured support to an object.

Statement 4. The device of statement 3, wherein the seal is attached to at least one of a human face, an air intake to a combustion engine, a filter assembly in air conditioning and heating assembly, and a respirator mask assembly.

Statement 5. The device of statement 1, wherein the filtration medium contoured support is configured to fit into a shell of a respirator.

Statement 6. The device of statement 1, wherein the contoured support has a radius of curvature between 1 and 500 cm.

Statement 7. The device of statement 1, wherein the contoured support has a radius of curvature between 2 and 100 cm.

Statement 8. The device of statement 1, wherein the contoured support has a radius of curvature between 5 and 50 cm.

Statement 9. The device of statement 1, wherein the contoured support comprises at least one of a filter, a plastic foam, a metallic foam., a semi-conductive foam, a woven material, a nonwoven material, and a plastic screen, Statement 10. The device of statement 1, wherein the contoured support has at least one of a conical shape, a spherical shape, and a cylindrical shape, and combinations thereof.

Statement 11. The device of statement 1, further comprising a rim secured to the countered support at a base of the contoured support.

Statement 12. The device of statement 1, wherein the nanofibers are integrally attached to the contoured support.

Statement 13. The device of statement 1, wherein the nanofibers are integrally attached one to another at points along respective ones of the nanofibers.

Statement 14. The device of statement 1, wherein the nanofibers are integrally attached to the rim.

Statement 15. The device of statement 1, wherein the nanofibers have an average fiber diameter of less than 500 nm.

Statement 16. The device of statement 1, wherein the nanofibers have an average fiber diameter of less than 200 nm.

Statement 17. The device of statement 1, wherein the nanofibers have an average fiber diameter of less than 100 nm.

Statement 18. The device of statement 1, wherein the plurality of nanofibers comprises between 4 to 4000 layers of the nanofibers.

Statement 19. The device of statement 1, wherein the plurality of nanofibers comprises between 10 to 100 layers of the nanofibers.

Statement 20. The device of statement 1, wherein the plurality of nanofibers comprises between comprise a thickness between 0.25 and 500 :m.

Statement 21. The device of statement 1, wherein said filtration medium has a figure of merit between 20 $kPa^{-1}$ and 40 $kPa^{-1}$.

Statement 22. The device of statement 1, wherein said filtration medium has a figure of merit between 40 $kPa^{-1}$ and 60 $kPa^{-1}$.

Statement 23. The device of statement 1, wherein said filtration medium has a figure of merit between 60 $kPa^{-1}$ and 70 $kPa^{-1}$.

Statement 24. The device of statement 1, wherein said filtration medium has a figure of merit between 70 $kPa^{-1}$ and 80 $kPa^{-1}$.

Statement 25. The device of statement 1, wherein the outside peripheral surface has the same number of layers over 90-99% of the entire surface area of the outside peripheral surface.

Statement 26. The device of statement 1, wherein the outside peripheral surface has the same number of layers over 95-99% of the entire surface area of the outside peripheral surface.

Statement 27. The device of statement 1, wherein the outside peripheral surface has substantially the same number of layers the entire surface area of the outside peripheral surface.

Statement 28. A respirator comprising a filtration medium; a housing holding the filtration medium; and a seal securing the filtration medium to the housing. The filtration medium having a contoured support having 1) an interior surface, 2) an outside peripheral surface spaced farther from a center of the contoured support than the interior surface, and 3) a rim enclosed and sealed to a perimeter of the contoured support. The filtration medium having macroscopic openings in the contoured support extending from the interior surface to the outside peripheral surface, and a plurality of nanofibers having diameters less than 1 micron, disposed on the outside peripheral surface of the contoured support, and covering the macroscopic openings on the contoured support.

Numerous modifications and variations of the present invention are possible in light of the above teachings. It is therefore to be understood that within the scope of the appended claims, the invention may be practiced otherwise than as specifically described herein.

The invention claimed is:

1. A method for producing conformal shaped fiber mats, comprising:
   feeding a substance from which a fibrous material is to be composed to an electrospinning extrusion element;
   extruding the substance through the electrospinning extrusion element;
   collecting the fibrous material on a contoured support disposed on a tilt axis tilted relative to the electrospinning extrusion element; and
   moving at least one of the electrospinning extrusion element and the contoured support to form the fibrous materials on the contoured support such that at least a tilt angle of the contoured support relative to the electrospinning extrusion element changes during the collecting while the contoured support rotates about the tilt axis of the contoured support,
   wherein
   the moving comprises tilting the electrospinning extrusion element relative to the contoured support, and
   the tilting comprises tilting the electrospinning extrusion element relative to the contoured support so that a time spent at plural stepped tilt angles is longer for greater tilt angles than smaller tilt angles of the electrospinning extrusion element relative to the contoured support.

2. The method of claim 1, wherein the moving comprises forming the fibrous material uniformly on the contoured support.

3. The method of claim 1, wherein the extruding the substance comprises applying an electric field to the electrospinning extrusion element to extract the substance from the electrospinning extrusion element.

4. The method of claim 3, wherein applying an electric field comprises applying said electric field to an electrospinning spinneret of the electrospinning extrusion element.

5. The method of claim 1, wherein the moving occurs during active positioning of the contoured support relative to the electrospinning extrusion element.

6. The method of claim 1, wherein the moving comprises providing substantially equal deposition and coverage of nanofibers across the surface of the contoured support.

7. The method of claim 1, wherein the electrospinning extrusion element is fixed while the contoured support is moved relative to the electrospinning extrusion element.

8. The method of claim 1, wherein said tilting comprises tilting the electrospinning extrusion element relative to the contoured support as a function of the tilt angle and time such that the tilt angle varies temporally relative to the contoured support.

9. The method of claim 1, wherein said tilting comprises tilting the electrospinning extrusion element relative to the contoured support so that a distance between the electrospinning extrusion element and a surface of the contoured support remains constant as the contoured support is tilted.

10. The method of claim 1, further comprising providing an auxiliary electric field to promote uniform deposition on the contoured support.

11. The method of claim 1, wherein the contoured support is shaped as a dome.

12. The method of claim 1, further comprising:
supplying a process gas during said extruding; and
drawing the process gasses through the contoured support.

13. The method of claim 12, wherein supplying a process gas comprises supplying $CO_2$ gas.

14. The method of claim 13, further comprising monitoring a pressure drop across the contoured support.

15. The method of claim 1, further comprising controlling at least one of a temperature and a humidity.

16. The method of claim 1, wherein collecting the contoured support comprises a metallic mesh.

17. The method of claim 16, further comprising applying a negative bias to the metallic mesh.

18. The method of claim 1, wherein the extruding the substance through the electrospinning extrusion element comprises electrospinning nanofibers onto the contoured support.

* * * * *